T. L. PHIPPS & W. BURMAN.
Assignors to L. S. LEE.
HAIR CLIPPER.
No. 10,931. Reissued May 15, 1888.
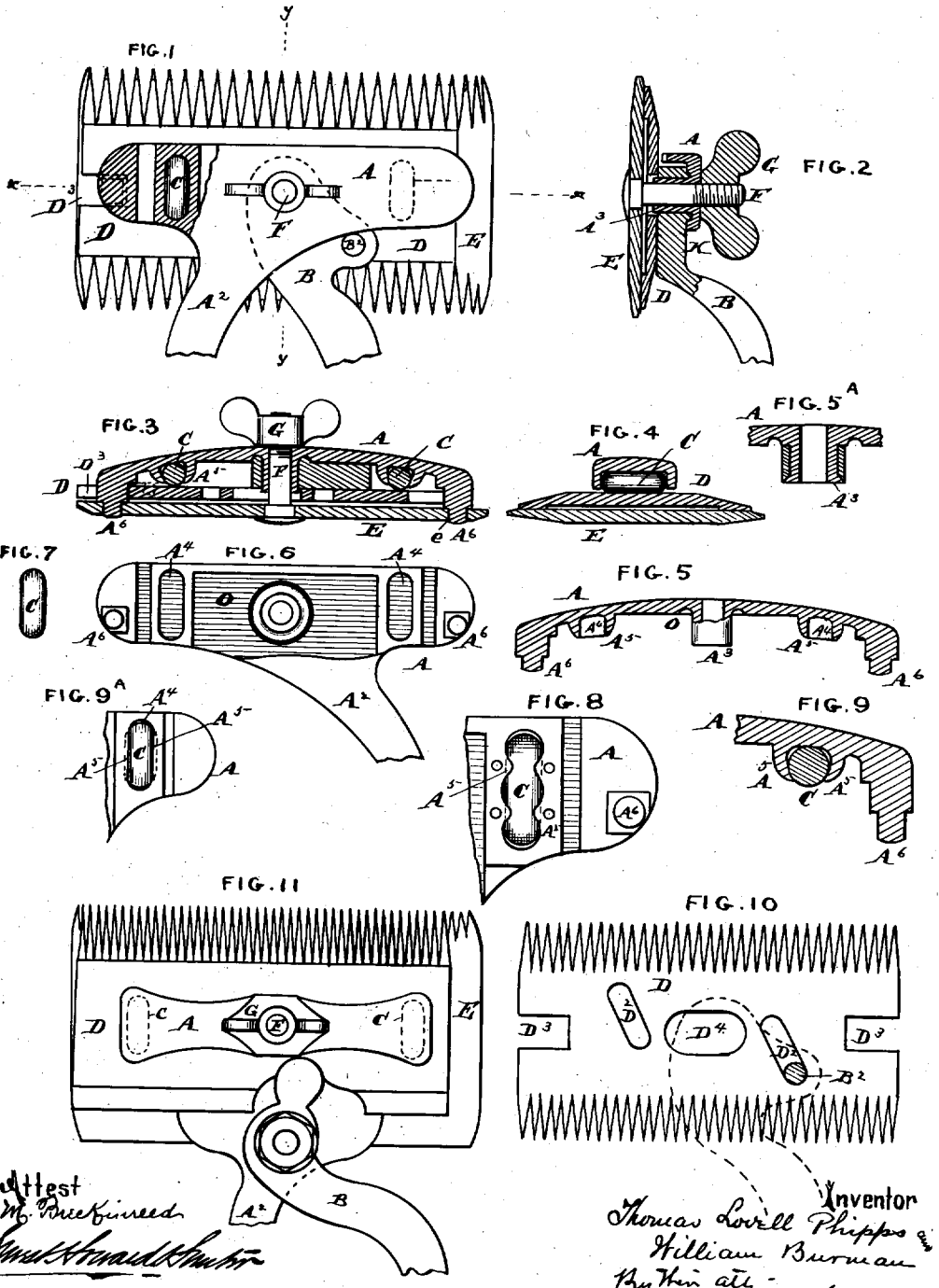
Attest
E. M. Buckingham
[illegible]
Inventor
Thomas Lovell Phipps
William Burman
By their atty.
[illegible]

UNITED STATES PATENT OFFICE.

THOMAS LOVELL PHIPPS AND WILLIAM BURMAN, OF RYLAND ROAD, EDGBASTON, NEAR BIRMINGHAM, COUNTY OF WARWICK, ENGLAND, ASSIGNORS TO LOUIS S. LEE, OF PHILADELPHIA, PENNSYLVANIA.

HAIR-CLIPPER.

SPECIFICATION forming part of Reissued Letters Patent No. 10,931, dated May 15, 1888.

Original No. 335,956, dated February 9, 1886. Application for reissue filed April 12, 1886. Serial No. 198,622. Patented in England July 7, 1885, No. 8,204.

*To all whom it may concern:*

Be it known that we, THOMAS LOVELL PHIPPS and WILLIAM BURMAN, both of Ryland Road, Edgbaston, near Birmingham, in the county of Warwick, England, manufacturers, have invented Improvements in Hair-Clippers, (for which we have obtained a patent in Great Britain, dated July 7, 1885, No. 8,204,) which improvement is fully set forth in the following specification, references being had to the accompanying drawings.

Our invention has for its object, principally, to simplify the construction and to render more efficient hair clipping or shearing machines or appliances—that is, appliances for the clipping or shearing of horses and other animals, also for the cutting of human hair, and for other similar purposes.

The essential features of improvement consists in combining with the cap and the reciprocating cutter-plate anti-friction rollers on each side of the clamping-screw, held in place by retaining-edges extending from the cap, whereby the friction between the said cap and cutter-plate is reduced to a minimum; further, in the cap which is secured to one handle being provided with a hollow hanging bush or cylinder bearing on which the secondary handle is pivoted, and through which hollow bush the tightening screw-pin for the cutter-plates passes; also in forming the top or moving cutter with inclined slots, wherein the pin on the secondary lever works for giving the necessary reciprocation, the inclined slot increasing the throw of the cutter-plate with a given movement of the operating-lever, and also arranging the various slots in the cutter-plate out of line, whereby it is not materially weakened.

Our invention also consists in the peculiar and novel formation and arrangement of the hanging bush by which the cap of the combined lever and head is attached to the cutter-plate.

Our invention further consists in the novel formation and combination of parts, whereby the friction-rollers are held in position between the cutter-plates.

Long roller-bearings are interposed between the under side of the cap and the upper side of the top cutter in order to reduce frictional contact between the bearing-surfaces, thereby rendering the clippers more efficient and easier to work. The long rollers, which are situated at opposite ends of the machine, are retained within their sockets or seats by closing or drawing the metal surrounding the seat slightly over the front of the roller, so as to prevent the rolling surfaces from falling out on the clipper being taken to pieces.

Figure 1 is a plan of a hair-clipper provided with improvements made according to our invention, the left-hand side of the cap being broken away in order to exhibit the roller, which lies in a recess or seat formed within its under side. Fig. 2 is a transverse vertical section on the dotted lines *y y*, Fig. 1. Fig. 3 is a longitudinal vertical section on the dotted lines *x x*, Fig. 1. Fig. 4 is a transverse section taken through a part opposite one of the rollers. Fig. 5 is a longitudinal section of the cap, showing partly in elevation the hanging bush or cylinder. Fig. 5$^{A}$ is the said bush, with a roller around it to reduce friction. Fig. 6 is an under side view of the combined cap and handle. Fig. 7 is one of the rollers. Fig. 8 is an under side view of the end of the cap upon a larger scale, and Fig. 9 is a cross-section. Fig. 9$^{A}$ shows how the metal surrounding the roller-seat is closed or drawn over on two opposite sides, instead of at points. Fig. 10 is a plan of the top cutter, showing the inclined slots. Fig. 11 is a modification showing that the roller-surfaces can be applied to clippers where the covering cap or head is separate from the handle.

The same letters of reference indicate corresponding parts in the several figures of the drawings.

E is the lower or stationary cutter, and is made with a double row of teeth.

D is the upper or reciprocating cutter, and is also made with a double row of teeth and rests upon a stationary cutter, E, being clamped thereon by the clamping-screw F and the nut G, which screw passes through the cap A. The cap A is secured to one of the handles $A^2$, and is provided at each end with extensions or pins $A^6$, the upper portions of which are made square and the lower parts round, which latter fit into holes *e* in the stationary cutter-plate E, holding it against lateral displacement, and the square or upper parts pass through the slot $D^3$ in the upper or reciprocating cutter-plate, D, insuring its being properly guided over the stationary plate. Near the ends of the cap and on each side of the clamping-screw are recesses $A^4$, into which anti-friction rollers or cylinders C are placed, and retained therein by the edges $A^5$ being bent over, as shown in Fig. 9. When the nut G is turned the cutter D is pressed against the rollers C, and when said plate is reciprocated by the handle B the working-contact between the cap and the said cutter is made through the said anti-friction rollers, thereby reducing the friction to a minimum and enabling the largest clippers made to be operated with as much ease as the smallest as now constructed. The cap A is recessed, as at O, and is provided with a downwardly-projecting tubular extension or bushing, $A^3$, upon which the lever B is pivoted, and through which bushing the clamping-screw F passes. This prevents any wear upon the handle or lever and increases the bearing, making the parts more durable. The bush $A^3$ may be surrounded by a roller (see Fig. $5^A$) to reduce friction.

The lever B is provided with the bearing portion K, through which the tubular extension extends, and is provided with the cutter-actuating pin $B^2$, which projects downward into the oblique slot $D^2$ of the cutter-plate D, being located to the rear and to one side of the pivotal point.

The reciprocating cutter-plate D is provided with a slot, $D^4$, through which the clamping-screw F passes, and upon each side of said slot with oblique slots $D^2$, which slots are arranged out of line, so as to strengthen the cutter as much as possible. Heretofore it was customary to place slots $D^2$ $D^4$ $D^2$ in direct line; but this greatly weakened the cutter and made it liable to be broken. The two slots $D^2$ are provided so that the cutter may be turned end for end, it being furnished with a double set of teeth, thereby making the cutter reversible. In addition to this advantage, due to strengthening the cutter-plate, the peculiar angle given to it enables a larger movement to be given to the cutter with a given movement of the lever or handle than is possible with the construction in which the slots are arranged in direct line. It is evident that so far as the anti-friction rollers or the construction of pivoting the handles or levers together are concerned, the remaining parts may be modified or changed to suit the ideas of the manufacturer, as these parts are clearly applicable to other makes of hair-clippers.

Having now described our invention, what we claim as new, and desire to secure by Letters Patent, is—

1. The cap A, formed with or having the hanging hollow bush or cylinder $A^3$ and a surrounding collar, in combination with the handle B and the binding-screw F, substantially as and for the purpose specified.

2. In a hair-clipping machine, the combination of the stationary cutter having holes *e'* near its lateral ends, the reciprocating cutter resting thereon and having guide-slots $D^3$, a stationary cap having projecting pins $A^6$ extending down through the slots $D^3$ and into the holes *e*, whereby the reciprocating cutter is guided upon the stationary cutter, anti-friction rollers arranged between the cap and reciprocating cutter-plate and close to the pins, a clamping-screw extending through the cutters and cap and arranged in line with the guide-pins $A^6$ and rollers, a lever to hold the stationary cutter and cap, and a lever to reciprocate the movable cutter, substantially as shown and described.

3. In a hair-clipping machine, the combination of a stationary cutter, a reciprocating cutter resting thereon, a stationary cap, anti-friction rollers arranged between the stationary cap and reciprocating cutter and near the lateral ends thereof, and a clamping-screw arranged through the cap and cutter-plates and within the area included between the ends of the anti-friction rollers, whereby the clamping effect shall come within such area and cause the cap to press flat upon the rollers, creating a uniform wear over their surface and their surfaces of contact, substantially as shown and described.

4. In a hair-clipping machine, the cap, in combination with anti-friction rollers, the said cap having retaining-edges which extend over the said rollers and prevent their falling out of the cap when the parts of the clippers are separated, substantially as and for the purpose specified.

5. The combination of the cap A, having pins $A^6$, and tubular projection $A^3$, with levers B K, having pin $B^2$, stationary cutter-plate E, having holes for reception of pins $A^6$, reciprocating cutter-plate D, having central slot, $D^4$, oblique slots $D^2$, and end guide-slots $D^3$, tightening-screw F, and nut G, substantially as and for the purpose specified.

6. In a hair-clipping machine, the combination of a stationary cutter, a reciprocating cutter, a cap secured to one lever and having a downwardly-extending tubular projection, supports between the ends of the cap and reciprocating cutter to hold the cap-body clear of the cutter, a clamping-screw extending through said tubular projection to clamp the cutters and cap together, and a pivoted lever for operating the reciprocating cutter, journaled on the tubular projection and resting upon the cutter-plate, substantially as shown and described.

7. The reversible cutter-plate for a clipping-machine, having the central slot, $D^4$, and the two oblique actuating-slots $D^2$ $D^2$, the said slots being arranged out of line, substantially as and for the purpose specified.

In testimony of which invention we hereunto set our hands.

THOMAS LOVELL PHIPPS.
WILLIAM BURMAN.

Witnesses:

ALFRED CANNING,
*Solicitor, 7 Temple Row West, Birmingham, England.*

FRANK. W. DOWNING,
*His Clerk.*